(12) United States Patent
Jensen et al.

(10) Patent No.: US 7,760,084 B2
(45) Date of Patent: Jul. 20, 2010

(54) REDUNDANT MONITORING

(75) Inventors: Thomas P. Jensen, Boise, ID (US); James Hatchett, Eagle, ID (US)

(73) Assignee: Paksense, Inc., Boise, ID (US)

( * ) Notice: Subject to any disclaimer, the term of this patent is extended or adjusted under 35 U.S.C. 154(b) by 329 days.

(21) Appl. No.: 11/999,785

(22) Filed: Dec. 7, 2007

(65) Prior Publication Data

US 2009/0146806 A1 Jun. 11, 2009

(51) Int. Cl.
G08B 1/08 (2006.01)
(52) U.S. Cl. ............... 340/539.26; 340/522; 340/572.4; 340/588
(58) Field of Classification Search ............ 340/539.26, 340/522, 572.1, 825.49, 572.4, 588; 235/384, 235/385
See application file for complete search history.

(56) References Cited

U.S. PATENT DOCUMENTS

| | | | |
|---|---|---|---|
| 5,282,685 A | 2/1994 | Koegler | |
| 5,746,203 A | 5/1998 | Hood, Jr. | |
| 5,795,069 A | 8/1998 | Mattes et al. | |
| 6,285,282 B1 * | 9/2001 | Dorenbosch et al. | 340/540 |
| 6,304,957 B1 | 10/2001 | Ishihara et al. | |
| 6,712,276 B1 * | 3/2004 | Abali et al. | 235/492 |
| 7,057,495 B2 * | 6/2006 | Debord et al. | 340/309.16 |
| 7,135,976 B2 * | 11/2006 | Neff et al. | 340/572.1 |
| 7,196,622 B2 * | 3/2007 | Lambright et al. | 340/539.26 |
| 7,248,147 B2 | 7/2007 | Debord et al. | |
| 7,423,535 B2 * | 9/2008 | Chung et al. | 340/572.4 |
| 2006/0227002 A1 | 10/2006 | Jensen et al. | |

FOREIGN PATENT DOCUMENTS

| | | |
|---|---|---|
| GB | 2 342 998 A | 4/2000 |
| WO | WO 2004/081505 A1 | 9/2004 |
| WO | WO 2007/100856 A2 | 9/2007 |

OTHER PUBLICATIONS

International Search Report. Mar. 30, 2009. 10 pgs.
Krstic, M.D., "A mid-value selet voter." Microelectronics Reliability 45 (2005), pp. 733-738.
Nagel, David J., "Microsensor clusters." Microelectronics Journal 33 (2002), pp. 107-119.

* cited by examiner

*Primary Examiner*—Toan N Pham
(74) *Attorney, Agent, or Firm*—Brooks, Cameron & Huebsch, PLLC

(57) ABSTRACT

Methods, mediums, systems, and devices for redundant monitoring are disclosed. One method of providing redundancy in an environmental monitoring device includes combining a first sensor, one or more redundant sensors, and a plurality of control logic components; monitoring a selected environmental condition using the plurality of sensors; measuring the selected environmental condition using the plurality of sensors each reporting to a particular control logic component among the plurality of control logic components, each of the plurality of control logic components monitoring a sequence of such measurements; and correlating corresponding monitored measurements from the sequence of measurements of each of the plurality of control logic components and determining whether a difference exists between the corresponding monitored measurements of each of the plurality of control logic components.

17 Claims, 10 Drawing Sheets

REDUNDANT MONITORING

BACKGROUND

Embodiments of the present disclosure relate generally to redundant monitoring of environmental conditions, converting and/or processing sensed data using electronic circuitry, as well as storing derived information and/or conveying derived information in order to inform users as to conditions that exist and/or previously existed.

SUMMARY

Producers, distributors, warehousers, and/or quality personnel, among others, especially those in charge of perishable, spoilable, and/or high-value items that are, for example, moving through a logistics supply chain, typically desire to know the condition of items for which their operation is accountable. Also, the customer perception of quality may be of value in some industries and, therefore, the monitoring of products through the supply chain may be used to indicate such quality to a customer base. Each of the producers, distributors, warehousers, quality personnel, and/or customers, among others, can be identified as a "user" of embodiments of the present disclosure.

Further, some entities may be interested in lowering insurance premium costs and the monitoring of products through the supply chain may be one way to reduce such costs. Monitoring the environment of products as they travel is a way of gaining such efficiencies, increasing traceability, and/or of providing for the quality and/or safety of products which can influence one or more of the above factors, among other benefits.

Embodiments of the present disclosure can be utilized to provide simple to use, low-cost, accurate, disposable, and/or re-usable devices as an element of a monitoring system. Device embodiments, for example, can be independent devices, and/or a tag and/or label that is attached to, and/or an assembly that is built into, a package.

In such embodiments, a single monitoring device can include a circuit assembly (e.g., printed circuitry) containing components such as a sensor or sensors, a power source, a control logic utility (e.g., a microcontroller having a microprocessor associated with control logic, among other arrangements for implementing control logic) and/or other electronic circuitry. Such embodiments, and other redundant monitoring embodiments of the present disclosure, can include rigid and/or flexible circuit components.

As used in the present disclosure, a control logic component can be or include software, firmware, and/or hardware for controlling and/or executing actions based upon data input (e.g., from one or more sensors). In some embodiments, a control logic component can utilize a clock signal to, for example, allow for comparison of data input and/or coordination of control and/or execution based thereon with one or more different control logic utilities.

A control logic component can, as used in the present disclosure, be a singular indicating one control logic utility and control logic components can be a plural indicating control logic utilities, that is, more than one (i.e., a plurality of) control logic components. As described in the present disclosure, one or more control logic components, can, in some embodiments, be combined into a single application-specific integrated circuit (ASIC) or other unitary logic structures.

Reliance on information provided by such a monitoring device can be enhanced by providing an indicator of circuit failure (e.g., a failsafe indicator) indicating that stored and/or derived information may be incorrect and/or is not to be trusted by a user. The present disclosure describes various embodiments of a failsafe indicator (i.e., failsafe output) achieved by using redundancy for some or all of the components in an environmental monitoring device (e.g., sensors, control logic, power sources, etc.)

By way of example and not by way of limitation, a temperature value sensed by a first temperature sensor can differ from a temperature value sensed at substantially the same time point by a redundant second temperature sensor, thereby indicating possible circuit failure of one or both temperature sensors and/or connected components. In such an instance, for example, redundant microcontrollers connected to the temperature sensors can use control logic, in various embodiments, to cross-compare the temperature output of the temperature sensors and, if the measured temperature values differ by more than a predetermined threshold, provide failsafe output to a user.

In various embodiments, the redundant monitoring device can be as small as about 1.5 inches square by about 0.1 inches high, which can, for example, be fit into larger materials. Some embodiments utilize a transparent, semi-transparent, or opaque pouch that forms an outer layer over the circuit assembly. Such pouches can be designed to meet industry standards, such as food safety standards. In this way, if the pouch is sealed, the pouch may be approved for use (e.g., as safe for placement adjacent to food) while the contents do not have to be approved. This can save time and/or money because the manufacturer may not have to gain approval of the apparatus to be placed within the pouch, in some instances, among other benefits.

In some embodiments, one or more portions of, or all of, a redundant environmental monitoring assembly, and/or an electronics assembly associated therewith, can be manufactured from one or more materials that meet one or more safety standards (e.g., a food safety standard). As defined herein, a safety standard can be any standard created by an entity (e.g., the U.S. Food and Drug Administration) to regulate usage, such as with food.

Various methods of using such redundant monitoring devices are described in the present disclosure. Further, the present disclosure provides embodiments for communicating with such devices and/or conveying their data in ways that fit the applications that the devices are intended to address.

These and other embodiments of the present disclosure will be discussed more fully in the detailed description. The features, functions, and/or advantages can be achieved independently in various embodiments of the present disclosure, or may be combined in yet other embodiments.

DETAILED DESCRIPTION

Figure 1:
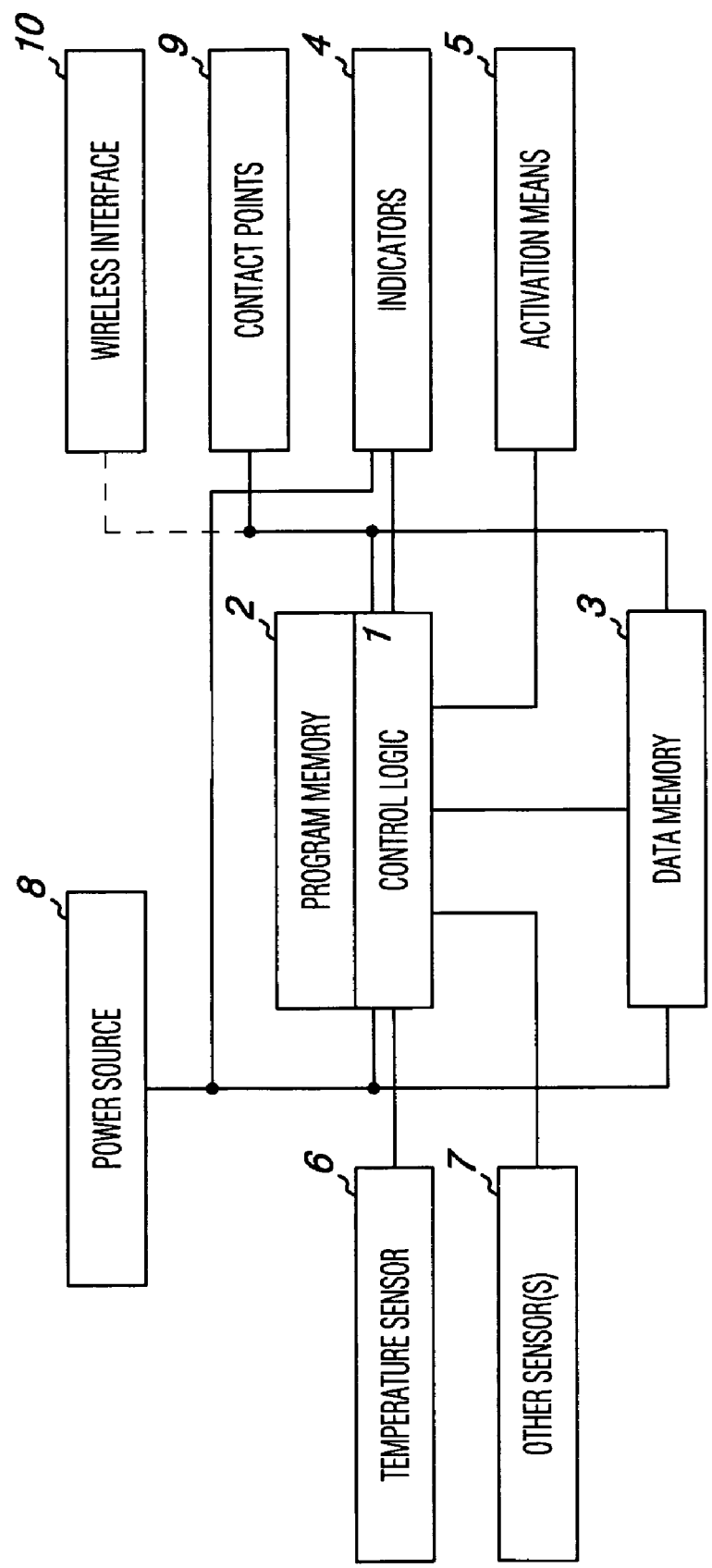
FIG. 1 is a schematic block diagram illustrating a single circuit according to an embodiment of the present disclosure.

The present disclosure describes a number of device, system, and method embodiments. For example, in some device embodiments, the device includes an electronic circuit and associated executable instructions (e.g., software, firmware, hardware, etc.), enclosed in a tag, label, or package that monitors environmental conditions.

The various embodiments of the present disclosure can include a number of different features and functionalities. For example, some device embodiments can be read through use of a reader that penetrates an outer coating of the device to touch a number of contacts therein.

Various embodiments can be used to monitor one or more environmental conditions at particular time points. Such environmental conditions can include temperature (e.g., ambient temperature and/or temperature of an adjacent product), humidity (e.g., ambient humidity and/or humidity localized to the adjacent product), physical impact, tilt, vibration, pressure, light, radioactivity, presence of biological organisms, and/or chemical agents, including gases, (e.g., experienced by the tag, label, and/or package as an ambient level in the surroundings and/or a level on and/or in the adjacent product), among other environmental conditions able to be sensed by one or more sensors, as appreciated by one of ordinary skill in the relevant art.

In some embodiments, the contacts are located on the outside of the device and therefore the reader does not penetrate the device. In various embodiments, the reader can be wireless and can receive information from the device without contacting the device.

Some wireless embodiments of the device and reader can be usable at short range and/or at long range. For example, some such embodiments can utilize portable device communication formats (e.g., a global system for mobile (GSM), and/or an ANSI-type radio access network, among others) to communicate information to and/or from the device.

The present disclosure also includes embodiments that can be activated by a variety of different mechanisms. For example, some embodiments can be activated by snapping, breaking, or bending a portion of the device, among other mechanisms (e.g., actuating a switch). Similarly, some embodiments can be activated by one or more radio frequency (RF) signals.

In some embodiments, the display of the device can also be provided in various forms. For example, a number of Light Emitting Diodes (LEDs) can be used, in some embodiments. In some embodiments, electrophoretic particles can be used to provide at least a portion of the display.

Various embodiments can utilize a chemical change to provide a portion of or the entire display functionality of the device. For example, an electrochemical component can be used to provide at least some display functionality, in some embodiments.

Some embodiments can have different physical characteristics. For example, various device embodiments can be designed to be folded, laminated, and/or pouched, and/or can be reusable or disposable.

Embodiments can include memory to store various data that is accumulated by the device, such as time and environmental condition data. In some embodiments, this information can be provided to a database that is not contained within the device (e.g., a database on a server with a web portal for access by a number of clients).

Embodiments can also be designed to take time and, for example, temperature measurements to record a number of times that a sensor has sensed an exceeded temperature threshold, a level to which a temperature has risen/fallen, and/or the amount of time that the sensor has sensed exceeding the threshold, rather than just recording that the sensor has sensed exceeding the temperature threshold at least one time. This can be important in some instances, particularly where not only the amount of time above and/or below the threshold is important, but in situations where the amount that the environmental condition was above and/or below the threshold is also important (e.g., in food safety situations where the higher the temperature to which a product is exposed, the more quickly it will perish).

The present disclosure also includes embodiments that incorporate memory compression techniques that allow the device to store more information. For example, a device embodiment can include a variation limit data compression mechanism that can discard data points if there is no change, or if the change is not outside a variation limit.

Data points can be averaged, in some embodiments, if the data points are within a particular range that is deemed acceptable (e.g., although the device can be designed and/or set to acquire data every minute, for example, some data points can be averaged and that average value can be stored, for instance, if all data averaged is within an acceptable range). In some embodiments, as discussed above, data points can be discarded. For example, if the temperature is the same, or within a threshold, data may be discarded. In some embodiments, such variation limits, thresholds, averaging and/or discard parameters can be set and/or adjusted by the user (e.g., the manufacturer, producer, distributor, warehouser, quality personnel, and/or seller, among others) based, for example, upon the type of product with which the device is to be used.

In some embodiments, executable instructions can be provided that are executable by control logic (e.g., a logic circuit that can, among others, include components selected from a processor, a microprocessor, a controller, a microcontroller, a program memory, a data memory, a clock, and/or an ASIC, in various embodiments) to take an environmental measurement at a predetermined time interval. In various embodiments, executable instructions can be provided that are executable by the control logic component to take an average of a number of such environmental measurements. These averages can, for example, be calculated through use of a number of sets of environmental measurements.

As an alternative to storing actual measured values at particular time intervals, executable instructions can, in some embodiments, be executable by the control logic component to store an environmental measurement if it is within a predetermined range of values and/or within a predetermined range of value variations. For example, when a temperature is between 40 and 70 degrees Fahrenheit (F), a range can be one threshold, such as 40 degrees F. with no second limit (thereby making the range, for example, 40 degrees F. and above) and the temperature can be recorded as such.

With respect to value variations, as used herein, a value variation is a variation from a particular value. The value can be preset, based upon an average as described above, based upon a last stored value or a last measured value, among other values that can be utilized to measure a variation therefrom.

Embodiments of the present disclosure can be fabricated from a variety of materials. For example, device embodiments can be fabricated with rigid or flexible circuit components, and various combinations thereof, and, in some embodiments, these components can be printed circuit components (e.g., where such components are combined in a single ASIC). These and other features and functionalities of the various embodiments of the present disclosure are discussed in more detail below.

Accordingly, among various embodiments of the present disclosure, redundancy in an environmental monitoring device can be performed by providing a plurality of redundant sensors and one or more control logic components. Monitoring a selected environmental condition therefore can be performed using the plurality of redundant sensors to measure the selected environmental condition, with the plurality of redundant sensors reporting to the same or different control logic components among the one or more control logic components, where each of the control logic components can record a sequence of such measurements.

Corresponding recorded measurements from the sequence of measurements of each of the control logic components can be correlated, and a determination can be made as to whether a difference exists between the corresponding recorded measurements of each of the control logic components. In some embodiments, a single circuit can be included in a discrete enclosure, such as a tag, label, or package for an adjacent product that can convey information (e.g., such as failsafe output regarding circuit failure) to users in one or more of a variety of ways. The single circuit can be designed to include the redundant sensors and the one or more control logic components.

FIG. 1 is a schematic block diagram illustrating a single circuit according to an embodiment of the present disclosure. FIG. 1 illustrates that a circuit of the tag, label, or package can include a control logic component 1, other logic circuitry and/or logic implementations (e.g., a state machine, logic hard-wired in an ASIC, etc.). The embodiment illustrated in FIG. 1 also shows that the circuit can include a program memory 2 and a data memory 3 (e.g., each of which can be read-only, read-writable, and/or variations thereof), a display and/or indicators 4, an activation mechanism 5, one or more environmental sensors 6 (e.g., a temperature sensor), one or more other optional sensors 7 (e.g., sensors for humidity, physical impact, tilt, vibration, pressure, light, radioactivity, presence of biological organisms, and/or chemical agents, among others), and/or a power source 8.

Activation mechanism 5 can be provided by a number of possible circuits and constructions, including ones that include a breakaway tab switch, a pull-tab switch, an infrared switch, a magnetic switch, an electromagnetic switch, and/or a radio frequency resonant switch, among other mechanism types. For example, with respect to either a breakaway tab switch or a pull-tab switch, activation can be accomplished by a user physically activating the circuit by actuating the switch. In some embodiments, a transmitting device can be used to remotely accomplish the activation.

A communications mechanism can be incorporated into the circuit, such as, for example, a set of target contact points 9, suitable for contacting with an external probe device, can be utilized and can be located within the monitoring device and/or can be positioned for contact without penetration into the monitoring device. As discussed above, a wireless interface 10, such as infrared or radio frequency modulation circuit, can be utilized in some embodiments.

Some purposes of the hardware described above, for example, can be to provide mechanisms for sensing environmental variables, performing storage of measured data, performing processing of the measured data (e.g., under control of embedded software, firmware, and/or hardware), providing display indications, and/or providing download and/or offload capability of processed data.

In some embodiments, a flexible or rigid printed circuit assembly (PCA) can serve as a substrate or mounting surface for the electronics. For example, the electronic components can be provided as surface mounted components. Some embodiments, such as that illustrated in FIG. 1, incorporate the power source 8 (e.g., a tab-mounted coin-cell type power source, and/or a paper-thin film power source, among others) into the circuit assembly.

Figure 2:
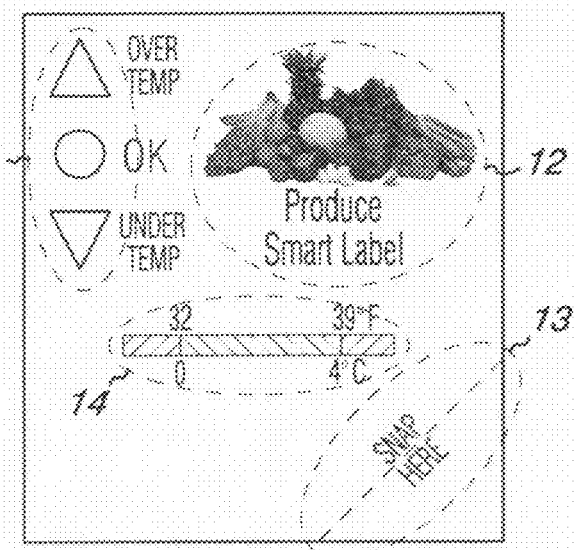
FIG. 2 illustrates a top view of a labeled circuit assembly, providing detail of display features, according to an embodiment of the present disclosure.

Also shown in the embodiment illustrated in FIG. 1 are a number of indicators 4, which can be LEDs in some embodiments. Such indicators 4 can, for example, be arranged to indicate an upper yellow, a middle green, and/or a lower yellow light as indicators of measurement levels. As discussed herein, other display indicators can be used in various embodiments FIG. 2 illustrates a top view of a labeled circuit assembly, providing detail of display features, according to an embodiment of the present disclosure. FIG. 2 shows by way of illustration how a label graphic can, in some embodiments, be constructed (e.g., from plastic and/or paper film, among other materials). A cover, for example including the label graphic, can be used to cover the circuit assembly. In such embodiments, the cover can include printed features on its surface.

In some embodiments, a cover can also be made larger such that it can be folded to cover both the front and the back of the PCA. In various embodiments, an area of the cover can be printed with legend information (e.g., text and/or symbols) that identifies what the one or more indicators signify. The label can be fabricated from any suitable material, including translucent or opaque materials, and/or can be provided as a clear material with overprinting thereon, in various embodiments.

In various embodiments, the label graphic and the PCA can be integrated such that a portion of, or the entire, printed circuit is part of, or attached to, the label material. In some such embodiments, the label may be designed such that the graphic, or portions thereof, may be applied before the printed circuit is created. In some embodiments, the label may be designed such that the graphic, or portions thereof, may be applied after the printed circuit is created.

In embodiments that utilize one or more illuminating indicators, such as LEDs, the indicators can illuminate printed lenses 11, for example, from behind. The display and/or one or more indicators can be lit, back-lit, and/or reflective in various embodiments. The legend information associated with the indicators (e.g., adjacent to the lenses 11 in FIG. 2) can be modified to suit the measurement and/or alert parameters that are programmed.

Various embodiments can use plastic films that accept inks that can be printed by ink-jet, laser, flexographic, and/or other suitable printing processes. Some embodiments may be capable of utilizing the high-resolution and/or deep color saturations possible using off-the-shelf printers, such as those available from Hewlett Packard, Canon, or Primera.

Embodiments can also include, by way of example and not by way of limitation, other graphic elements such as a logo, target product identification area 12, an activation break point graphic 13, and/or a temperature limit graphic 14, as illustrated in the embodiment of FIG. 2. The logo and/or target product identification area 12, as well as the temperature limit graphic 14 can be used, for example, to provide a tag, label, or package supplied with a unique graphic that is matched to the parameters that are, for example, programmed into a control logic component's program memory 2 and/or data memory 3, as shown in FIG. 1.

For instance, as shown in FIG. 2, features 12 and 13 can provide identification of the target product and its parameters. The activation break-point graphic 13, in the embodiment of FIG. 2, is placed over an area of the printed circuit assembly that has a breakaway corner, to indicate to the user where the circuit can be activated by actuating a switch when it is time for monitoring to commence. In some embodiments, such as in some flex circuit embodiments, this activation mechanism can be a tear off or snap corner, as such activation mechanisms are appreciated by one of ordinary skill in the relevant art.

Figure 3:
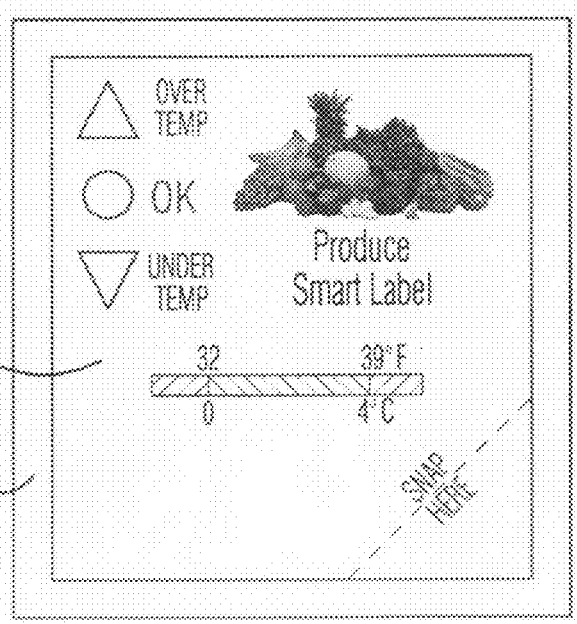
FIG. 3 illustrates a top view of a pouched monitoring device according to an embodiment of the present disclosure.

FIG. 3 illustrates a top view of a pouched monitoring device according to an embodiment of the present disclosure. In some embodiments, a PCA (e.g., a printed circuit with a cover label 15), as depicted in FIG. 3, can be inserted into a pouch 16. The pouch can be of any suitable material and can be sealed permanently or resealably in any suitable manner. For instance the pouch can be heat-sealed, glued, and/or have a physical sealing structure formed from the pouch material.

As stated above, in some embodiments, the pouch can be fabricated of a material that meets one or more requirements within a particular field of implementation. For example, in the field of food transportation, the material may be a material deemed safe to be placed near or in contact with food.

Examples, of such materials can include, but are not limited to, materials including plastics, vinyls, polystyrenes, and/or other such materials. For instance, polyethylene terephthalate (PET) is one suitable plastic material for use with food. In some embodiments, the exterior of the pouch can meet such a requirement, while the interior may or may not meet a requirement.

Figure 4:
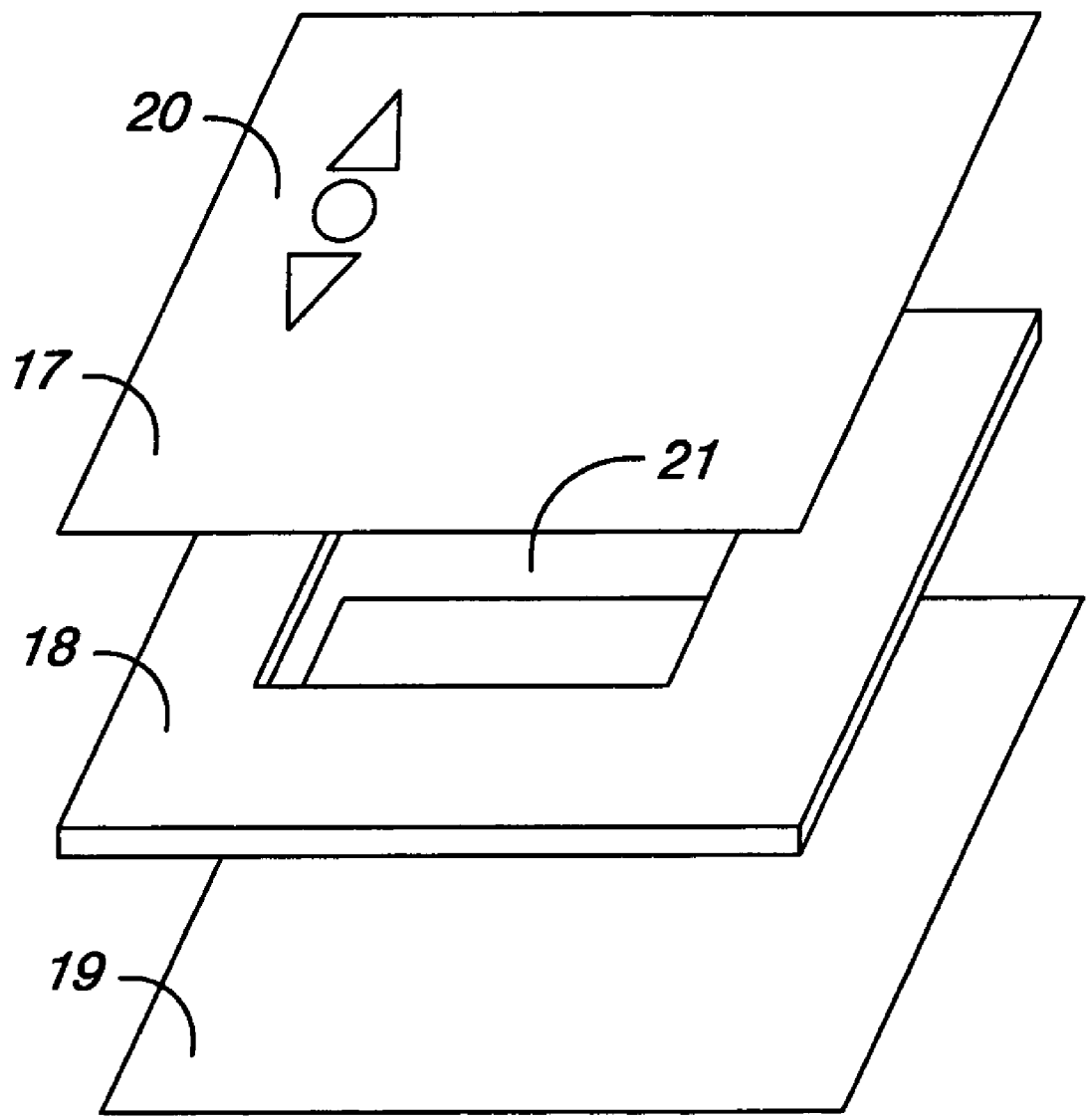
FIG. 4 illustrates a partially exploded view of a monitoring device according to an embodiment of the present disclosure.

FIG. 4 illustrates a partially exploded view of a monitoring device according to an embodiment of the present disclosure. In various embodiments, such as that illustrated in FIG. 4, a PCA can be inserted into a hole 21 (e.g., a die-cut cavity) in a piece of material, such as in a piece of foam (e.g., closed-cell) or plastic 18, which can then be laminated on its top and/or bottom surfaces (e.g., with printed plastic film covers, 17 and 19). In some embodiments, the film can be heat sealed to the foam and/or can be adhered with adhesive to the foam. Embodiments having such a laminated assembly can include graphic information and/or lenses 20 as part of a top film cover 17, which, for example, may comprise translucent or clear material with overprinting, or can have lenses.

In various embodiments, the tag or label device may also be inserted into a packaging material. In such embodiments, the tag or label may be built into or added to a larger label or a larger pouch that can be adhered to a package, incorporated into packaging material, and/or inserted into a package.

Figure 5:
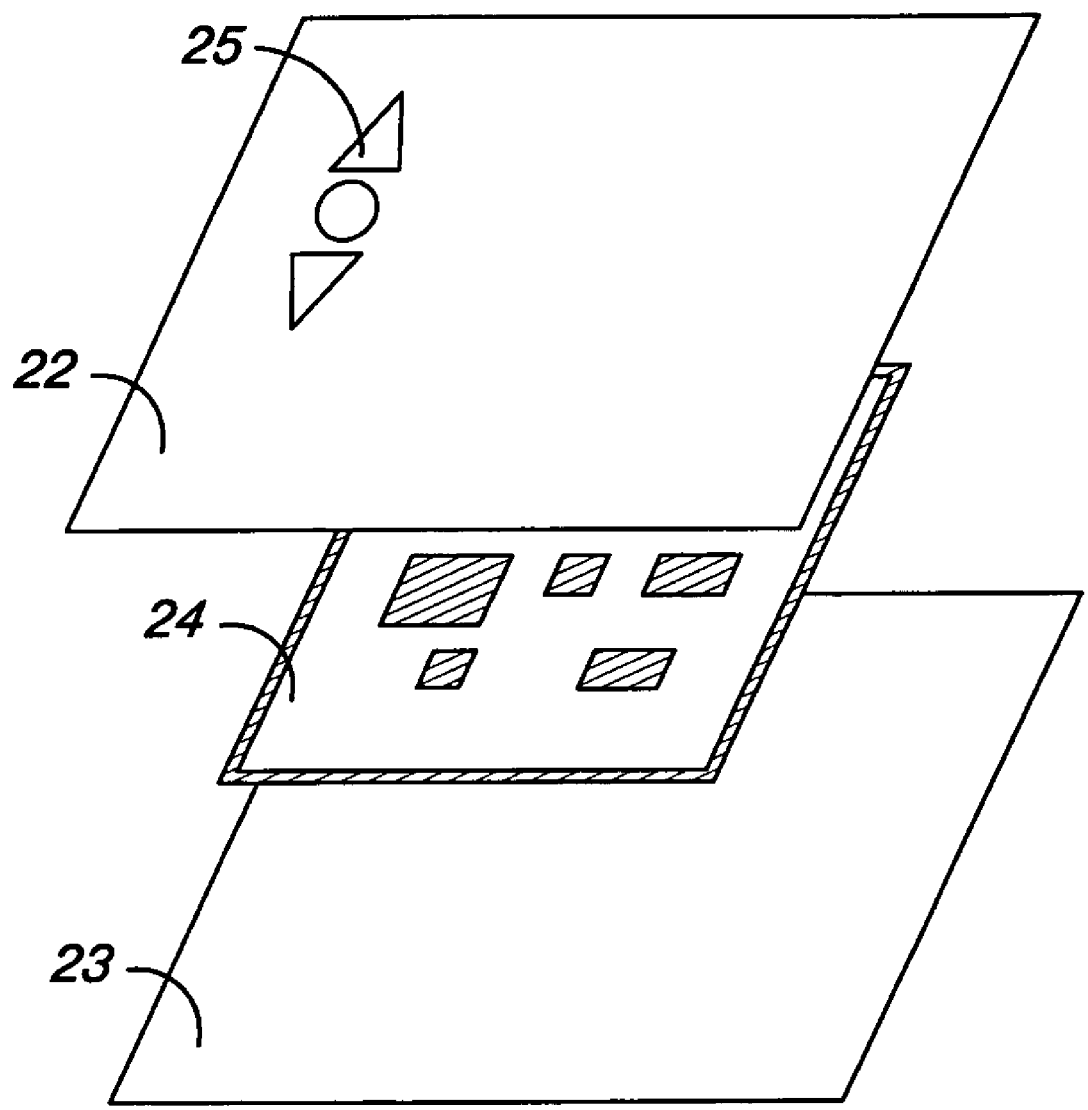
FIG. 5 illustrates another partially exploded view of a monitoring device according to an embodiment of the present disclosure.

FIG. 5 illustrates another partially exploded view of a monitoring device according to an embodiment of the present disclosure. FIG. 5 illustrates an embodiment of a tag or label that shows a top cover 22 and a bottom cover 23 that cover the top and bottom of PCA 24. Such an embodiment can also have graphic information and/or lenses 25 as part of the top film cover 22, which may, in some embodiments, comprise translucent or clear material with overprinting, and/or can have openings with lenses built in as separate materials.

Figure 6:
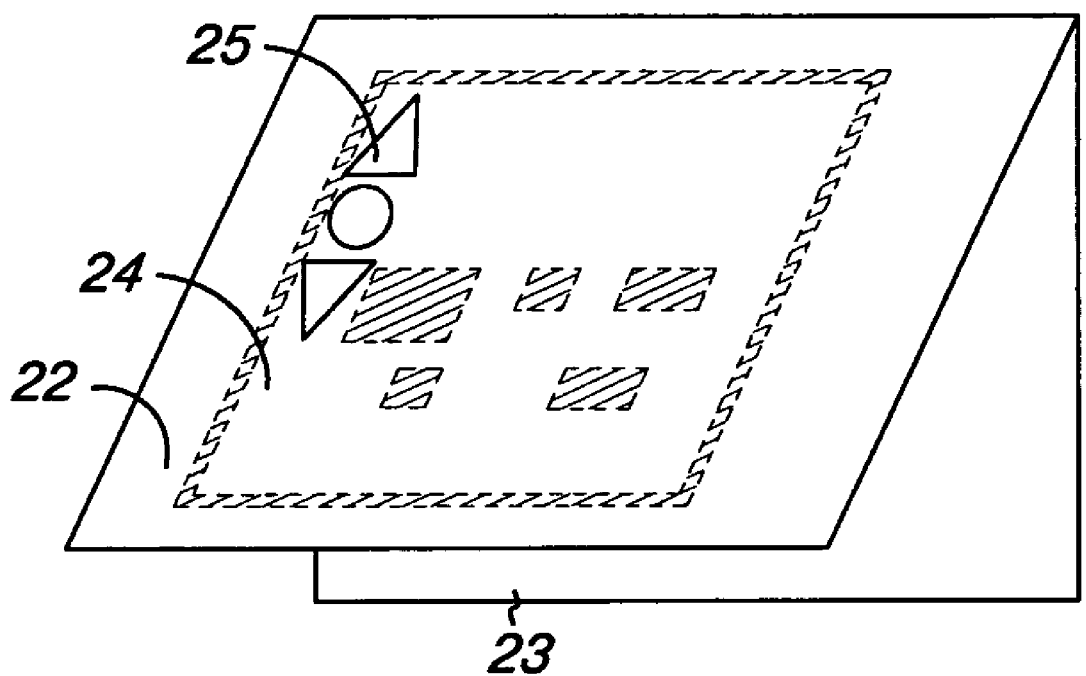
FIG. 6 illustrates a cover detail of a monitoring device according to an embodiment of the present disclosure.

FIG. 6 illustrates a cover detail of a monitoring device according to an embodiment of the present disclosure. FIG. 6 illustrates an embodiment, having a top label graphic cover 22 and a bottom cover 23 that are constructed from the same piece of material (e.g., folded or cut in half, or other dimensions/shapes). In some embodiments, the PCA 24 is mounted underneath the top half of the cover 22, and aligned with lenses 25.

If an adhesive is used to bond the covers 22 and 23 to PCA 24, and/or to each other, the assembly can be utilized as a covered electronic assembly with label surfaces on both sides, and/or can include lenses for the light transmission of the indicators, as illustrated, for example, in FIGS. 2 and 3. In various embodiments, the assemblies of FIGS. 5 and/or 6 can be inserted into the pouch as discussed with respect to FIG. 3.

Various tag-, label-, and/or package-based device embodiments can be provided that process and/or store data. Embodiments can facilitate communication of the data to reader devices.

In such embodiments, reader devices can communicate by way of any suitable direct connection (e.g., via the use of probe pins) and/or by way of any suitable wireless connection type. Suitable types of wireless connections can include infrared, LEDs (e.g., which, in some embodiments, can emit pulsed visible light in data transmission mode), radio frequency amplification and/or modulation, and/or other means of electromagnetic frequency communication, among other connection types, as appreciated by one of ordinary skill in the relevant art.

With respect to embodiments utilizing a connection via radio frequency communication, radio frequency based readers can utilize a one-way (transmit only) or a two-way radio mechanism to be associated with the tag, label, or reader device. Likewise, a one-way (receive only) or two-way radio connection can be used by the reader device to match the tag, label, or package device with which it will be communicating.

These data radio mechanisms can be based upon established standards, such as IEEE 802.11b, and/or be based upon other proprietary radio technologies. The radio mechanisms associated with the tag, label or package devices may also participate in a networked (e.g., a mesh network) or similar interface scheme to communicate with the reader. These types of networks may fall within IEEE 802.15.4 standards development, among others.

As readers gather the data from their respective tags, labels, or packages, the readers, in turn, can communicate the data or files to databases or other storage locations. In some embodiments, this can be accomplished via another type of data device. For example, such devices can include a standalone gateway, hub, router, or other type of computing device, such as a personal computer, portable computing device, and/or server type computing device.

These devices can communicate with tag, label, or package readers by way of wired and/or wireless interfaces, including Internet or other connection types. Through these connections, data can be forwarded to one or more databases for storage and/or analysis, among other functions. If a gateway or hub device communicates wirelessly to a database, then it can be autonomous with respect to its immediate environment.

In such embodiments, a gateway and/or hub device can be situated, for example, in a warehouse, on a pier, and/or in an industrial area to perform its function without utilizing additional local information technology infrastructure. This can represent added value, for example, for users who do not wish to upgrade their existing computer and/or IT equipment.

Figure 7:
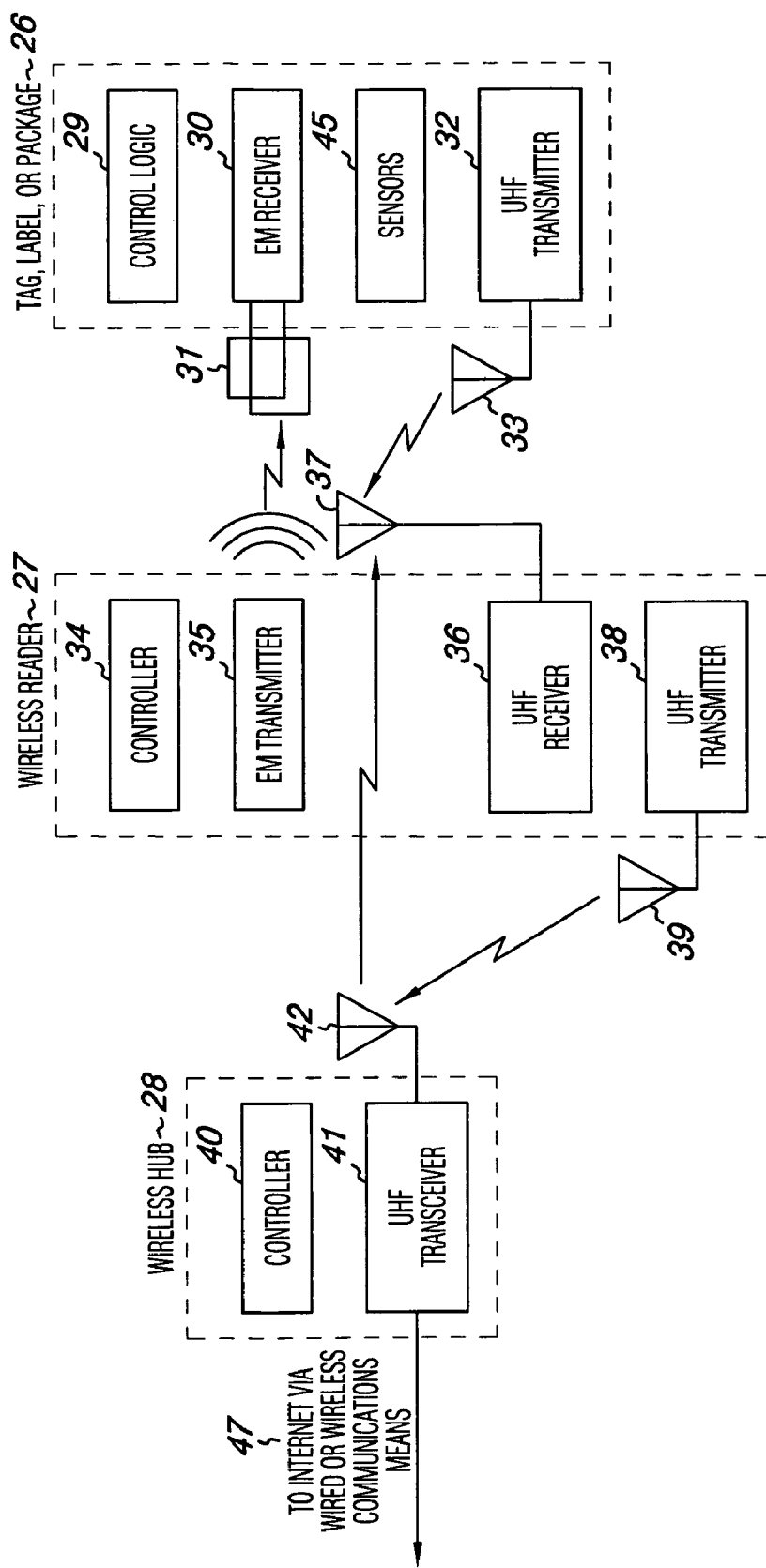
FIG. 7 is a schematic block diagram illustrating connectivity of elements of a system embodiment according to the present disclosure.

FIG. 7 is a schematic block diagram illustrating connectivity of elements of a system embodiment according to the present disclosure. FIG. 7 illustrates a schematic block diagram showing a wireless reader 27 and a wireless hub 28 in communication with a tag, label, and/or package device 26.

As shown, each device can, in some embodiments, have its own logic circuitry associated with a control logic component 29 and/or a controller 34, and 40, respectively. The logic circuits can, in such embodiments, utilize, for example, a microcontroller and/or microprocessor device in communication with program memory and/or data memory, a state machine functionality, logic circuitry utilizing a number of flip-flops, and/or other such logic components. As such, these microcontrollers and/or microprocessors can control the operation of the other devices in each respective circuit using control logic.

The embodiment illustrated in FIG. 7 can include a number of different communication links in various formats. That is, communication links can be in any suitable format.

For example, in the embodiment illustrated in FIG. 7, an electromagnetic (EM) communication transmitter 35 is employed in wireless reader device 27 to form a communication link to send a pulse or series of pulses to EM receiver 30 via an antenna 31 (e.g., a coil type antenna), thereby utilizing an EM channel. The transmitting and/or receiving functionality of a communication link can be provided by one or more transmitters, receivers, and/or transceivers. Although designated as EM transmitters and receivers in the embodiment illustrated in FIG. 7, it is to be understood that any suitable wireless and/or wired communication mechanisms can be utilized in various embodiments of the present disclosure.

An EM channel can operate at close range and can be used to initiate an upload of data, for example, telling the tag, label, and/or package device 26 to wake-up and begin transmitting data via a transmitter (e.g., an ultra-high frequency (UHF) transmitter 32) and antenna 33 to the wireless reader's 27 receiver (e.g., a UHF receiver 36) via its antenna 37. In such embodiments, the wireless reader 27 can receive and/or process the data using its controller 34.

Such devices can also be designed to transmit processed data to wireless hub 28 using, for example, the UHF transmitter 38, via an antenna 39, to a transceiver (e.g., a UHF transceiver 41) of the wireless hub 28 via an antenna 42. Wireless hub 28 can, in some embodiments, also be utilized to transmit signals containing commands and/or data to, for example, the UHF receiver 36 of the wireless reader 27 via its antenna 37.

Figure 8:
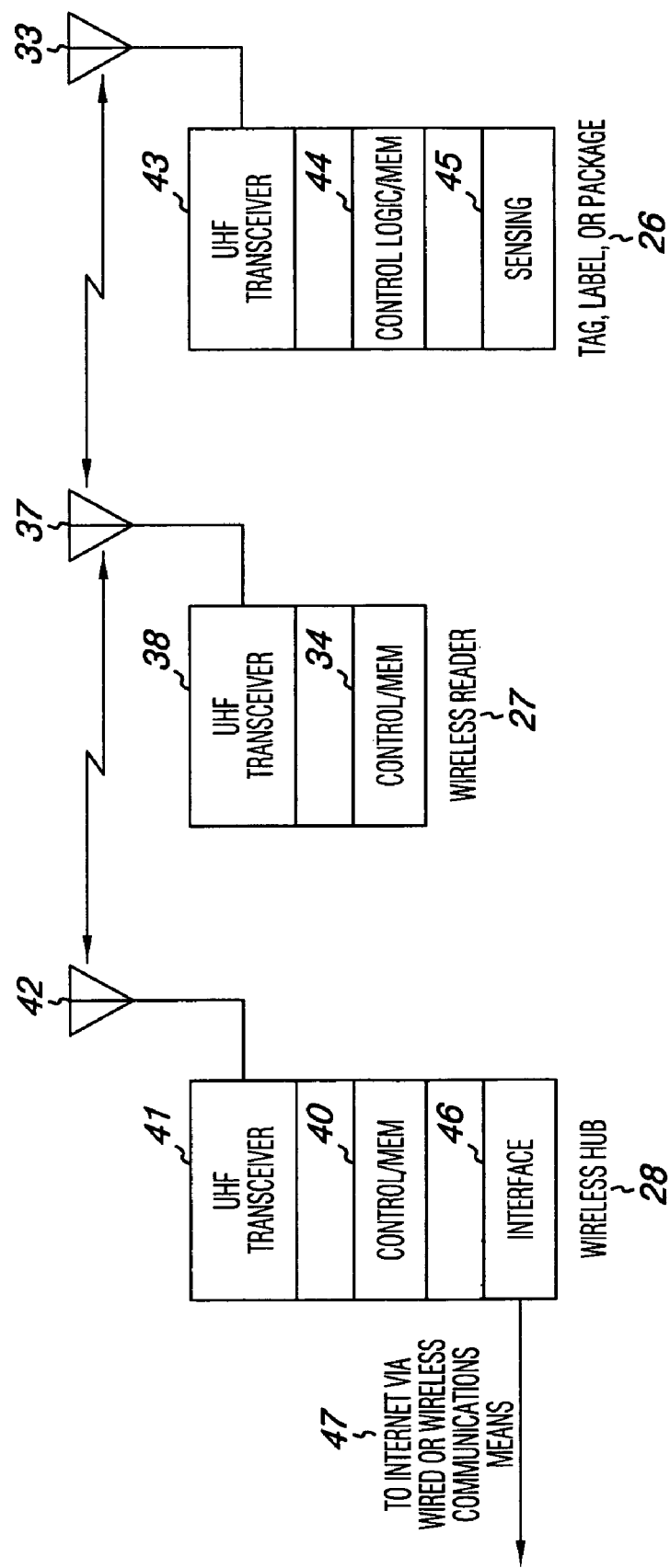
FIG. 8 is another schematic block diagram illustrating connectivity of elements of a system embodiment according to the present disclosure.

FIG. 8 is another schematic block diagram illustrating connectivity of elements of a system embodiment according to the present disclosure. As illustrated in FIG. 8, a wireless reader 27 can, in various embodiments, transmit data from a tag, label, or package directly and/or via a communication link (e.g., wireless hub 28) over a wired or wireless network 47 to a remote location (e.g., to a remote device such as a hub and/or computing device via the Internet) or directly to a computing device for storage and/or analysis.

Such communications can, for example, be accomplished via a data modem and/or a communication link (e.g., a communication interface). A wireless reader can be beneficial in some fields of use since the products being shipped may not be near a fixed power source and/or fixed computing device.

The wireless reader can transfer data via a radio frequency (RF) modem and/or a network, for example, by GSM communication. The wireless reader may also transfer data over a wired connection, for example, via a universal serial bus (USB), to a hub and/or other network device (e.g., a computing device) for storage and/or analysis. Such hubs and/or computing devices may also transfer the data via wired and/or wireless communications to a remote location for storage and/or analysis.

The schematic block diagram shown in FIG. 8 illustrates another embodiment with a similar communication technique to that illustrated in FIG. 7. In the embodiment illustrated in FIG. 8, all of the communications for the tag, label, and/or package device 26, wireless reader device 27, and/or wireless hub device 28 can be implemented using, for example, UHF transceivers 43, 38, and 41, respectively, which are present in each respective device, along with antennae 33, 37, and 42, respectively.

The transceivers illustrated in FIG. 8 allow the same or similar communication capabilities as enabled by the system illustrated in FIG. 7. Transceivers can have various standard protocols, including 13 MHz or UHF forms of Radio-Frequency Identification (RFID) transceivers, IEEE 802.11, IEEE 802.15.4 type devices, and/or non-standard and proprietary protocol devices, among others.

As is the case for the embodiment illustrated in FIG. 7, each device illustrated in FIG. 8 has its own logic circuitry 44, 34, and 40, respectively. As described above, these logic circuits can utilize control logic implemented by combinations of microcontroller and/or microprocessor devices, among other control logic component types, in communication with program memory and/or data memory (MEM). Each tag, label, or package device 26 can also include sensing circuitry 45.

The wireless hub 28 can communicate to databases by wired and/or wireless communication means through an interface 46 via, for example, the Internet 47, or another media conduit. Similar to the embodiment illustrated in FIG. 7, the wireless reader 27 illustrated in FIG. 8 may also transfer data to a remote location by wired and/or wireless communications. This may be accomplished, for example, via a communication interface 46. Such embodiments may utilize the Internet and/or mobile communications networks for transferring data.

Figure 9:
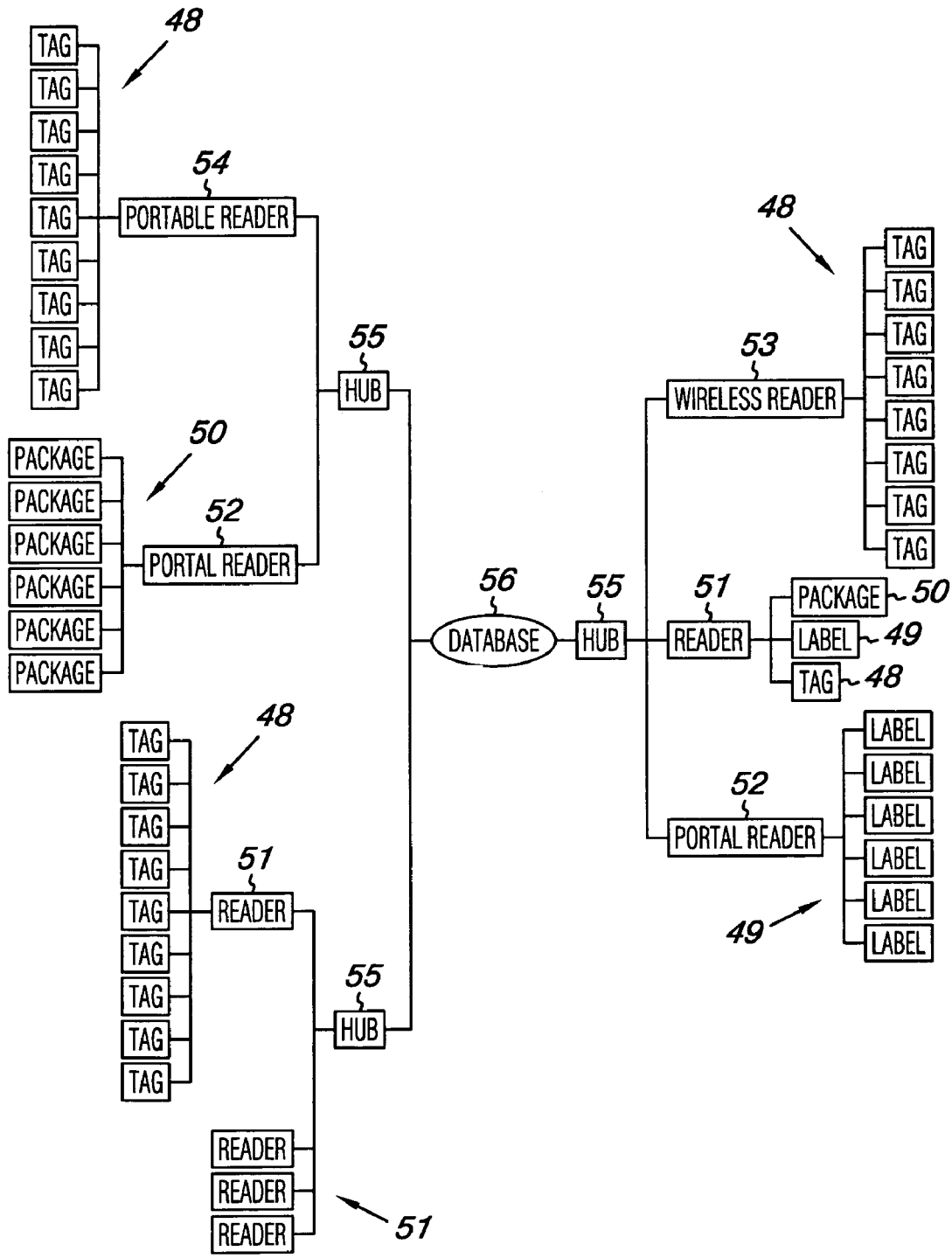
FIG. 9 is a flowchart illustrating a connectivity schema of tags, labels, and/or packages in a monitoring system embodiment according to the present disclosure.

FIG. 9 is a flowchart illustrating a connectivity schema of tags, labels, and/or packages in a monitoring system embodiment according to the present disclosure. FIG. 9 shows a connectivity diagram illustrating an example of how tags 48, labels 49, and/or packages 50 can all be connected in locations distant from one another into a database 56 using different types of readers (e.g., reader 51). Readers can be fixed (e.g., a portal reader 52 mounted on a portal to a building) or be a portable reader 54 (e.g., a wireless reader 53). As such, readers can communicate in a wired and/or wireless manner.

In various embodiments, each reader can be in communication with a hub 55 that is in its locality, among other locations. Each hub can be configured to connect to a database 56 or multiple databases.

In some embodiments, a reader can also provide the functionality of a hub and/or be a hub network device. In such embodiments, the system may not utilize independent hub devices, but rather, one or more of the readers can provide such functionality to the systems. In some embodiments, hubs and/or readers can be used to provide such functionality. In the tag, label, or package device of the present disclosure, executable instructions can be loaded and/or executed by various embodiments of control logic components.

The executable instructions (e.g., loaded or embedded in software/firmware/hardware) can implement a variety of methods of data compression. In various embodiments, the sensor readings can be compared to past readings and decisions can be made, based, for example, upon programmed, settable parameters and/or upon the value of the new data. For instance, if a new reading is within one or more settable window limits as compared to the last reading, then the new reading may not be stored, and if outside of the limits, then the reading may be stored.

In some embodiments, data compression can be provided by storing the difference between two values (e.g., adjacent values in time, adjacent values as stored, difference from a reference value, etc.).

Another storage condition can be used, such that if a settable period of time has passed since the last storage of a reading, then a new reading will also be stored. Such criteria (e.g., limits and/or periods of time) can be designed to be pre-programmed and/or programmable in the field, in various embodiments.

In some embodiments, in order for circuit assemblies for tags, labels, and/or packages, as described above, to be manufactured in volume, it may be advantageous that they be loaded, during manufacture, with tuning parameters that allow application-specific, and/or custom-tuned, functionality to suit different users' monitoring desires.

An example that can be employed to accomplish tuning at the end of the manufacturing process is called late-stage customization. This can involve building a PCA to be generic. With such embodiments, it may be possible for PCAs to be inventoried as generic units until an order is placed for some quantity of tag, label, package, or reader products is to be filled.

The order may contain information that can be used to customize the generic assemblies. For example, at the point where an order is to be filled, the generic PCA can then receive its executable instructions and/or data. Once such programming is accomplished, a power source (e.g., power source 8 of FIG. 1) can be connected to the circuit. In some embodiments, the generic PCA may have the power source attached prior to programming of main and/or customized executable instructions. In some such embodiments, the device can be designed such that the program can provide a power-on self-test procedure and then go to sleep, waiting for activation by a user to occur.

In some embodiments, the executable instructions, for example, upon powering up after the power source (e.g., a battery) is installed, can set up a number of variables, read setpoint, and/or alert data from the EEPROM, and then put the control logic component into a sleep mode. In sleep mode, the control logic component can, for example, still be powered but not execute instructions, and therefore draw very low power levels in order to preserve the life of power source, among other benefits.

Some embodiments can employ and/or make use of specific parameters, previously stored in the EEPROM array contained within the tag, label, or package circuit, for example, to establish the personality of the tag, label, or package, among other uses. The executable instructions can, for instance, read these personality parameters upon activation, allowing for executable instructions to then behave according to loaded parameters.

The parameters can be data that allow configuration setpoints of, for example, limits for over-temperature, under-temperature, or time-temperature integration thresholds. Other parameters can include serial numbers, model numbers, times, locations, and/or data sample rates, among others. This information can allow for indication and/or alert modes to be stored, retrieved, and/or utilized to set specific desired operations, among other functions.

Various embodiments can include the incorporation of printed information onto the front and/or back surfaces of the tag, label, or package, which can, for example, be printed during manufacturing. Executable instructions, including, for example, specific compiled or assembled program code and/or parametric or personality data, as described above, can be written (e.g., via a programming fixture) to the program and/or one or more data memory components of a generic PCA that is to be finalized into a tag, label, or package.

With regard to different methods of attaching this monitoring device onto other items (e.g., a product) some approaches include using adhesive backing, use of a mounting tab and/or a hole for attaching, tying, or hanging on to an item's container, and/or attaching directly onto an item to be monitored. Device embodiments can be built directly into cardboard or plastic packaging, or into totes, bins, or other product containers or assemblies.

The monitoring devices described herein can be built to a specification established by quality assurance personnel. The unused tag, label, or package monitoring device can be first installed in its monitoring situation and activated at the desired time. The device also can be programmed for a delayed activation, such that the device begins recording after a programmed delay and/or the occurrence of an event, such as a temperature and/or moisture threshold being met or exceeded.

In some embodiments, the device can be programmed for a delay in monitoring for alerts. In such embodiments, the device can be designed to begin collecting data once activated, but to not act on that data for a set period of time.

In some embodiments, as illustrated in the representations shown in FIGS. 2 and 3, a corner tab can be pre-cut into the PCA upon fabrication. This tab or a portion thereof can be a thin section that forms a break-off activation switch. In various embodiments, the corner may be scored to facilitate weakening the corner and/or creating a uniform mechanism for activating the device.

When activation is desired, the user can actuate a switch (e.g., snap the corner) that, for example, opens a circuit trace that runs across the break boundary, which in turn activates the microcontroller and/or microprocessor so that it can begin monitoring. Once activated, the indicators (e.g., LEDs) can, in some embodiments, acknowledge that the device has been activated (e.g., flash a number of times).

In operation, the LEDs of the embodiments illustrated in FIGS. 1-6 can be constructed to indicate, for example, an upper yellow, a middle green, and/or a lower yellow light on the surface of the device, when shining through the lens areas. In some embodiments, for example, the upper yellow indicator can serve as an over limit status indicator, the lower yellow indicator as an under limit status indicator, and/or the center green indicator can serve as an OK status indicator.

In such embodiments, the LED indicators can, for example, flash once every few seconds, and/or can also perform double, triple, or coded flashes to signify different status conditions, again as programmed to suit particular applications. An aspect of having indicators that are able to respond to programmatic settings and/or to indicate derived parameters is that they can provide a summary of events that occur over time. In effect, the one or more indicators can provide a compressed form of data to the viewer.

In various embodiments, the environmental monitoring device can be designed to be customized in late stage manufacture and/or by the user(s). For example, in some embodiments, the formation of the environmental sensing components, control logic components, power sources, and/or encapsulating materials can be accomplished to form an environmental monitoring device, and then one or more user-specified items can be added to the environmental monitoring device.

Adding a user-specified item to the environmental monitoring device can, for example, be accomplished by printing the user-specified item on an outer surface of the encapsulating material, by providing an item of data to be used by the control logic components in determining whether an action should be taken based upon received sensing information, by configuring the control logic components with a user-specified configuration to be used in determining whether an action should be taken based upon the received sensing information, and/or other user-specified information, among other items. Such items can include user-specified logos, identifiers, unit-specific identification numbering, threshold information, sampling periods, etc.

In some such embodiments, the addition of these items can be accomplished wirelessly, which may allow the manufacture of the assembly to be completed or substantially completed before the customization is accomplished. Such embodiments can be particularly beneficial where a user may do the customization because the assemblies can be sent to the user with just the remaining customization left to be accomplished.

In some embodiments, the encapsulation may not yet have been accomplished when the customization is undertaken. Such embodiments can be beneficial where the assembly is to have printed information thereon that is to be applied just prior to shipping to a user and/or to be print by a user thereon. In some such embodiments, printed items and/or data items can be added, for example.

Figure 10A:
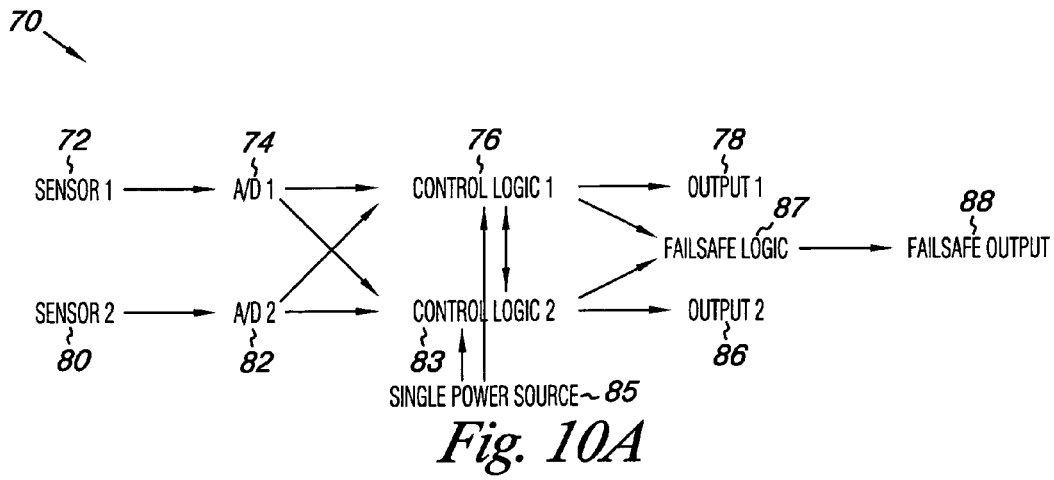
FIGS. 10A-10C are schematic block diagrams illustrating embodiments of a number of redundant monitoring circuit configurations according to the present disclosure.
Figure 10B:
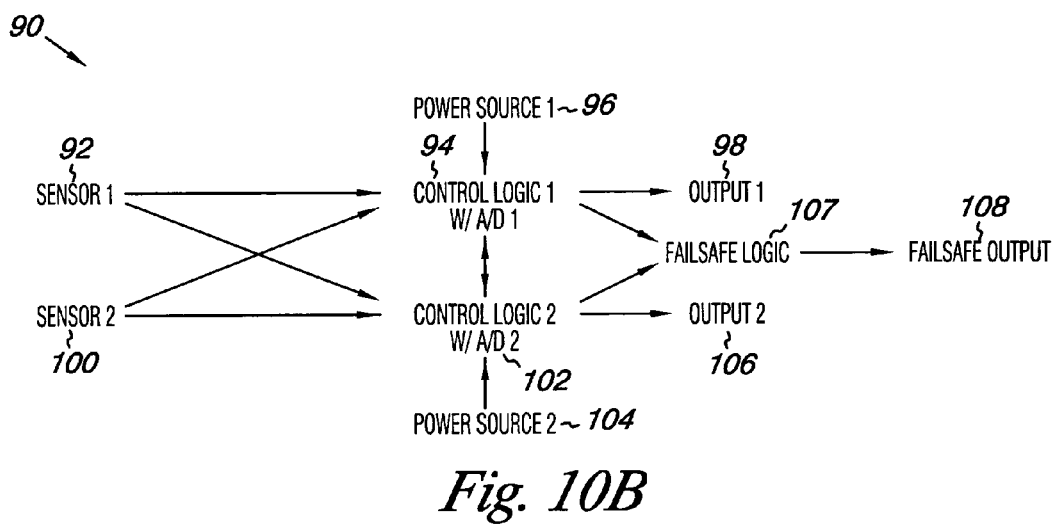
Figure 10C:
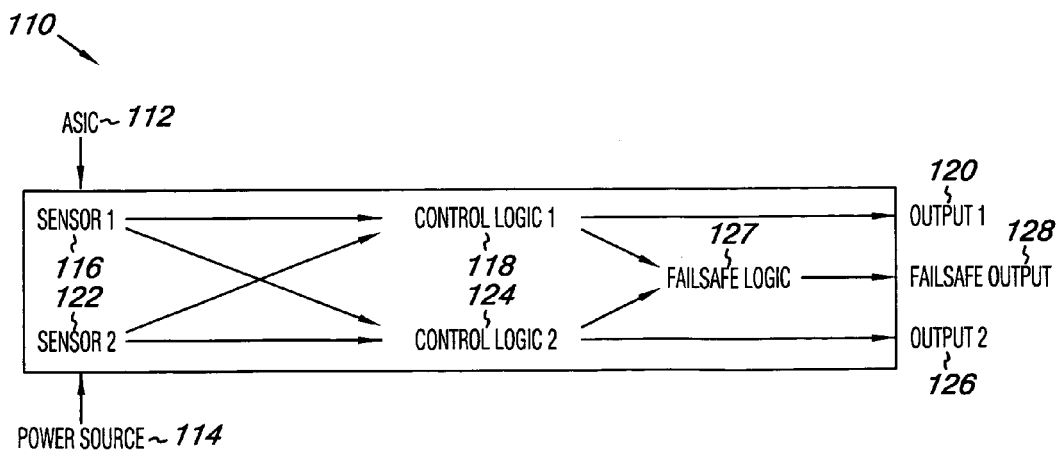

FIGS. 10A-10C are schematic block diagrams illustrating embodiments of a number of redundant monitoring circuit configurations according to the present disclosure. FIG. 10A illustrates an example of a circuit configuration embodiment 70 for redundant monitoring of environmental conditions.

The circuit configuration embodiment 70 illustrated in FIG. 10A shows a first sensor 72 for acquiring and/or outputting data that enables measurement of an environmental condition (e.g., a thermistor for measuring temperature). In some embodiments, the sensors (e.g., the thermistor) can output analog data.

A control logic component can be described as a "computer-on-a-chip" that can be embedded into a circuit array, such as, for example, a PCA as described above. As such, a control logic component can be suitable for handling input of digital data to enable processing thereof. Analog data from a sensor of an environmental condition can, in various embodiments, be converted to digital data for processing by a control logic component by using an analog-to-digital (A/D) converter.

The embodiment of the circuit configuration 70 illustrated in FIG. 10A shows a first A/D converter 74 receiving input of analog data enabling measurement of an environmental condition from the first sensor 72 and/or outputting digital data to a first control logic component 76 to enable measurement and/or processing of the environmental condition data. Among a number of possible functions, the first control logic component 76 can provide a first output 78 that, for example, indicates that a measured temperature exceeds a predetermined threshold temperature, as described in the present disclosure.

The embodiment of the circuit configuration 70 illustrated in FIG. 10A also shows a second sensor 80 for acquiring and/or outputting data to enable measurement of the same environmental condition as enabled by the first sensor 72 (e.g., a second thermistor for measuring temperature) and a second A/D converter 82 receiving input of analog data enabling measurement of the environmental condition from the second sensor 80. The second A/D converter 82 can output digital data to a second control logic component 83 to enable redundant measurement and processing of the environmental condition data. Among a number of possible functions, the second control logic component 83 can provide a second output 86 that, for example, also indicates that a measured temperature exceeds a predetermined threshold temperature, as described in the present disclosure.

The second output 86 measurement of the environmental condition can be, in the absence of circuit failure, substantially the same as the first output 78 when the first sensor 72 and the second sensor 80 have sensed the environmental condition at substantially the same point in time. In the context of the present disclosure, the term "circuit failure" can include situations where there is no output, inaccurate output, and/or inadequate output, from one or more sensors of environmental conditions, from one or more A/D converters, and/or one or more control logic components.

As illustrated in FIG. 10A, circuit failure causing lack of output from any of the components can result, for example, from interruption of electrical power supply from a power source 85 that enables functionality of the first control logic component 76 and the second control logic component 83, along with the components associated with each control logic component. Additionally, inaccurate output from any of the components can result, for example, from partial power drain to the component, malfunction of the component, and/or miscalibration of the component, among other causes.

Faulty output (e.g., lack of output inaccurate output and/or inadequate output) from any of the individual components (as opposed to, for example, lack of electrical power supplied to any of the components) can, in various embodiments, be diagnosed as circuit failure by comparing correlated output measurements taken at substantially the same point in time. For example, as illustrated in the embodiment shown in FIG. 10A, a failsafe logic component 87 can receive input from the first control logic component 76, which can, in some embodiments, be the same as the first output 78, and the failsafe logic component 87 can also receive input from the second control logic component 83, which can, in some embodiments, be the same as the second output 86.

The failsafe logic component 87 can, in some embodiments, analyze and/or compare the inputs from the first control logic component 76 and the second control logic component 83 to determine whether a difference between the output values for measurements of the environmental condition exceeds a predetermined threshold value. When the difference between the output values for the measurements does exceed a predetermined threshold value, the failsafe logic component 87 can be programmed to provide a failsafe output 88 that can be communicated to a user by any of the pathways described in the present disclosure.

In some embodiments of the circuit configuration 70, such as that illustrated in FIG. 10A, the first control logic component 76 and the second control logic component 83 can exchange measurement values for the environmental condition, as indicated by the double-headed arrow provided between the two control logic components. In addition, the first control logic component 76 can receive input of digital measurement data acquired by the second sensor 80 from the second A/D converter 82 and the second control logic component 83 can receive input of digital measurement data acquired by the first sensor 72 from the first A/D converter 74.

Consequently, the first control logic component 76 can have both its measurement value and the measurement value from the second control logic component 83, which can enable the first control logic component 76 to make a comparison of the two measurement values to determine whether a difference between the output values for measurements of the environmental condition exceeds a predetermined threshold value. Similarly, the second control logic component 83 can have both its measurement value and the measurement value from the first control logic component 76, which can also enable the second control logic component 83 to make a comparison of the two measurement values to determine whether a difference between the output values for the measurements exceeds the predetermined threshold value.

In such embodiments, a determination that the difference between the output values for the measurements exceeds the predetermined threshold value can be output to the failsafe logic component 87 by the first control logic component 76 and/or the second control logic component 83. When, for example, the circuit failure prevents output of a measurement value by one of the control logic components, either the first control logic component 76 or the second control logic component 83 can provide input to the failsafe logic component 87 that the difference between the output values for the measurements exceeds the predetermined threshold value. The failsafe logic component 87 can then provide a failsafe output 88 that can be communicated to the user.

FIG. 10B illustrates another example of a circuit configuration embodiment for redundant monitoring of environmental conditions. The circuit configuration embodiment 90 illustrated in FIG. 10B shows a first sensor 92 for acquiring and/or outputting data that enables measurement of an environmental condition (e.g., a thermistor for measuring temperature). As described in the present disclosure, in some embodiments, the sensors (e.g., the thermistor) can output analog data and the analog data from the sensor can, in various embodiments, be converted to digital data for processing by the control logic component by an A/D converter.

The embodiment illustrated in FIG. 10B illustrates that a first control logic component 94 can be formulated to include a first A/D converter for converting the analog output of the first sensor 92 to digital input for the first control logic component 94, in some embodiments. As such, the embodiment of the circuit configuration 90 illustrated in FIG. 10A shows the first A/D converter that is associated with the first control logic component 94 receiving input of analog data to enable measurement of an environmental condition from a number of sensors, such as the first sensor 92, and outputting digital data to the first control logic component 94 to enable measurement and/or processing of the environmental condition data. Among a number of possible functions, the first control logic component 94 can provide a first output 98 that, for example, indicates that a measured temperature exceeds a predetermined threshold temperature, as described in the present disclosure.

The circuitry configuration embodiment 90 illustrated in FIG. 10B shows that the first control logic component 94 can receive input of analog measurement data acquired by the second sensor 100, which can be converted by the A/D converter associated with the first control logic component 94, and the second control logic component 102 can receive input of analog measurement data acquired by the first sensor 92, which can be converted by the A/D converter associated with the second control logic component 102, in some embodiments.

In contrast to the embodiment of the circuit configuration 70 illustrated in FIG. 10A having a single power source 85, the circuit configuration 90 illustrated in FIG. 10B shows each redundant monitoring pathway to have a dedicated power source (e.g., a separate battery). For example, the first control logic component 94 illustrated in FIG. 10B is shown to have a first power source 96 to provide electrical power to the first control logic component 94 and its associated components (e.g., the first sensor 92 and the inherent first A/D converter).

The embodiment of the circuit configuration 90 illustrated in FIG. 10B also shows a second sensor 100 for acquiring and/or outputting data to enable measurement of the same environmental condition as enabled by the first sensor 92 (e.g., a second thermistor for measuring temperature). A second A/D converter is shown to be associated with a second control logic component 102 to receive input of analog data enabling measurement of the same environmental condition from the second sensor 100 as input by the first sensor 92 to the first control logic component 94.

The second A/D converter can be designed to provide digital data to the second control logic component 102 to enable redundant measurement and/or processing of the environmental condition data, in some embodiments. Among a number of possible functions, the second control logic component 102 can provide a second output 106 that, for example, also indicates that a measured temperature exceeds a predetermined threshold temperature, as described in the present disclosure. Similar to the first control logic component 94 illustrated in FIG. 10B being shown to have a first power source 96, the second control logic component 102 is shown to have a second power source 104 to provide electrical power to the second control logic component 102 and its associated components (e.g., the second sensor 100 and the inherent second A/D converter).

The second output 106 measurement of the environmental condition can be, in the absence of circuit failure, substantially the same as the first output 98 when the first sensor 92 and the second sensor 100 have sensed the environmental condition at substantially the same point in time. In the context of the embodiment of the circuit configuration 90 illustrated in FIG. 10B, circuit failure causing lack of output from the first or second set of components can result, for example, from interruption of electrical power supply from a dedicated first power source 96 and/or a dedicated second power source 104 that enable functionality of the first control logic component 94 and the second control logic component 102, along with the components associated with each control logic component.

Each of the first and second sets of components can have a separate dedicated power source in the embodiment of FIG. 10B. As such, faulty output, (e.g., lack of output, inadequate output, and/or inaccurate output) from both sets of individual components, is less likely to occur due to lack of electrical power being supplied to any of the components, as compared to the embodiment illustrated in FIG. 10A.

Similar to the embodiment illustrated in FIG. 10A, circuit failure can, in various embodiments, be diagnosed in FIG. 10B by comparing correlated output measurements taken at substantially the same point in time. For example, failsafe logic component 107 can receive input from the first control logic component 94, which can, in some embodiments, be the same as the first output 98, and the failsafe logic component 107 can also receive input from the second control logic component 102, which can, in some embodiments, be the same as the second output 106.

The failsafe logic component 107 can, in some embodiments, analyze and/or compare the inputs from the first control logic component 94 and the second control logic component 102 to determine whether a difference between the output values for measurements of the environmental condition exceeds a predetermined threshold value. When the difference between the output values for the measurements does exceed the predetermined threshold value, the failsafe logic component 107 can be programmed to provide a failsafe output 108 that can be communicated to a user by any of the pathways described in the present disclosure.

In some embodiments of the circuit configuration 90 illustrated in FIG. 10B, the first control logic component 94 and the second control logic component 102 can exchange measurement values for the environmental condition, as indicated by the double-headed arrow provided between the two control logic components. The first control logic component 94 having both its measurement value and the measurement value from the second control logic component 102 can enable the first control logic component 94 to make a comparison of the two measurement values to determine whether a difference between the output values for measurements of the environmental condition exceeds a predetermined threshold value. Similarly, the second control logic component 102 having both its measurement value and the measurement value from the first control logic component 94 can also enable the second control logic component 102 to make a comparison of the two measurement values to determine whether a difference between the output values for the measurements exceeds the predetermined threshold value.

In such an embodiment, a determination that the difference between the output values for the measurements exceeds the predetermined threshold value can be output to the failsafe logic component 107 by both the first control logic component 94 and the second control logic component 102. When, for example, the circuit failure prevents output of a measurement value by one of the control logic components, either the first control logic component 94 or the second control logic component 102 can provide input to the failsafe logic component 107 that the difference between the output values for the measurements exceeds the predetermined threshold value. The failsafe logic component 107 can then provide a failsafe output 108 that can be communicated to the user.

FIG. 10C illustrates another example of a circuit configuration embodiment for redundant monitoring of environmental conditions. The circuit configuration embodiment 110 illustrated in FIG. 10C shows an ASIC 112 that can be formulated as a unitary circuit configuration in which communication between subcomponents can be inherent. First and second control logic components are not shown in FIG. 10C because the ASIC 112 can be considered to include and subsume the functions of a plurality of control logic components, among other subcomponents.

The ASIC 112 in the embodiment illustrated in FIG. 10C shows a first sensor 116 subcomponent for acquiring data that enables measurement of an environmental condition. The data from the first sensor 116 can be provided to a first control logic component 118 subcomponent, which, among other functions, can convert analog data from the first sensor 116 to digital data for processing by the first control logic component 118. In addition, the data from a second sensor 122 can be provided to a second control logic component 124 subcomponent, which, among other functions, can convert analog data from the second sensor 122 to digital data for processing by the second control logic component 124.

Control logic incorporated into the ASIC 112 can, among other functions, operate to perform functions described in the present disclosure for an individual control logic component. As such, the first control logic component 118 can perform the functions described in the present disclosure for the first control logic components in FIGS. 10A and 10B and the second control logic component 124 can perform the functions described in the present disclosure for the second control logic components in FIGS. 10A and 10B. Hence, the first sensor 116 can provide sensed input to both the first control logic component 118 and the second control logic component 124 and the second sensor 122 also can provide sensed input to both the first control logic component 118 and the second control logic component 124, in some embodiments.

Among a number of possible functions, the first control logic component 118 can, for instance, provide a first output 120 from the ASIC 112 that, for example, indicates that a measured temperature exceeds a predetermined threshold temperature, as determined by the first control logic component 118 and as described in the present disclosure. The second control logic component 124 can, among a number of possible functions, provide a second output 126 from the ASIC 112 that, for example, also indicates that a measured temperature exceeds a predetermined threshold temperature, as determined by the second control logic component 124 and as described in the present disclosure.

In contrast to the embodiment of the circuit configuration 90 illustrated in FIG. 10B showing each redundant monitoring pathway having a dedicated power source (e.g., a separate battery for each control logic component), the circuit configuration 110 illustrated in FIG. 10C shows that ASIC 112 can, in some embodiments, have one power source 114 (e.g., a single battery).

The second output 126 measurement of the environmental condition can be, in the absence of circuit failure within the ASIC 112, substantially the same as the first output 120 when the first sensor 116 and the second sensor 122 have sensed the environmental condition at substantially the same point in time. Similar to the embodiments illustrated in FIGS. 10A and 10B, circuit failure can, in various embodiments, be diagnosed by the ASIC 112 illustrated in FIG. 10C by, for instance, comparing correlated measurements taken at substantially the same point in time. For example, failsafe logic component 127 can receive input from the first control logic component 118, which can, in some embodiments, be the same as the first output 120, and the failsafe logic component 127 can also receive input from the second control logic component 124, which can, in some embodiments, be the same as the second output 126.

The failsafe logic component 127 can, in some embodiments, analyze and/or compare the inputs from the first control logic component 118 and the second control logic component 124 to determine whether a difference between the output values for measurements of the environmental condition exceeds a predetermined threshold value. When the difference between the output values for the measurements does exceed a predetermined threshold value, the failsafe logic component 127 can be programmed to provide a failsafe output 128 from the ASIC 112 that can be communicated to a user by any of the pathways described in the present disclosure.

In some embodiments of the circuit configuration 110 illustrated in FIG. 10C, the first control logic component 118 and the second control logic component 124 can exchange measurement values for the environmental condition by being part of the same ASIC, as will be appreciated by one of ordinary skill in the relevant art. The first control logic component 118 having both its measurement value and the measurement value from the second control logic component 124 can enable the first control logic component 118 to make a comparison of the two measurement values to determine whether a difference between the output values for measurements of the environmental condition exceeds a predetermined threshold value. Similarly, the second control logic component 124 having both its measurement value and the measurement value from the first control logic component 118 can also enable the second control logic component 124 to make a comparison of the two measurement values to determine whether a difference between the output values for the measurements exceeds the predetermined threshold value.

In such an embodiment, a determination that the difference between the output values for the measurements exceeds the predetermined threshold value can be output to the failsafe logic component 127 by both the first control logic component 118 and the second control logic component 124. The failsafe logic component 127 can then provide a failsafe output 128 from the ASIC 112 that can be communicated to the user.

Figure 11:
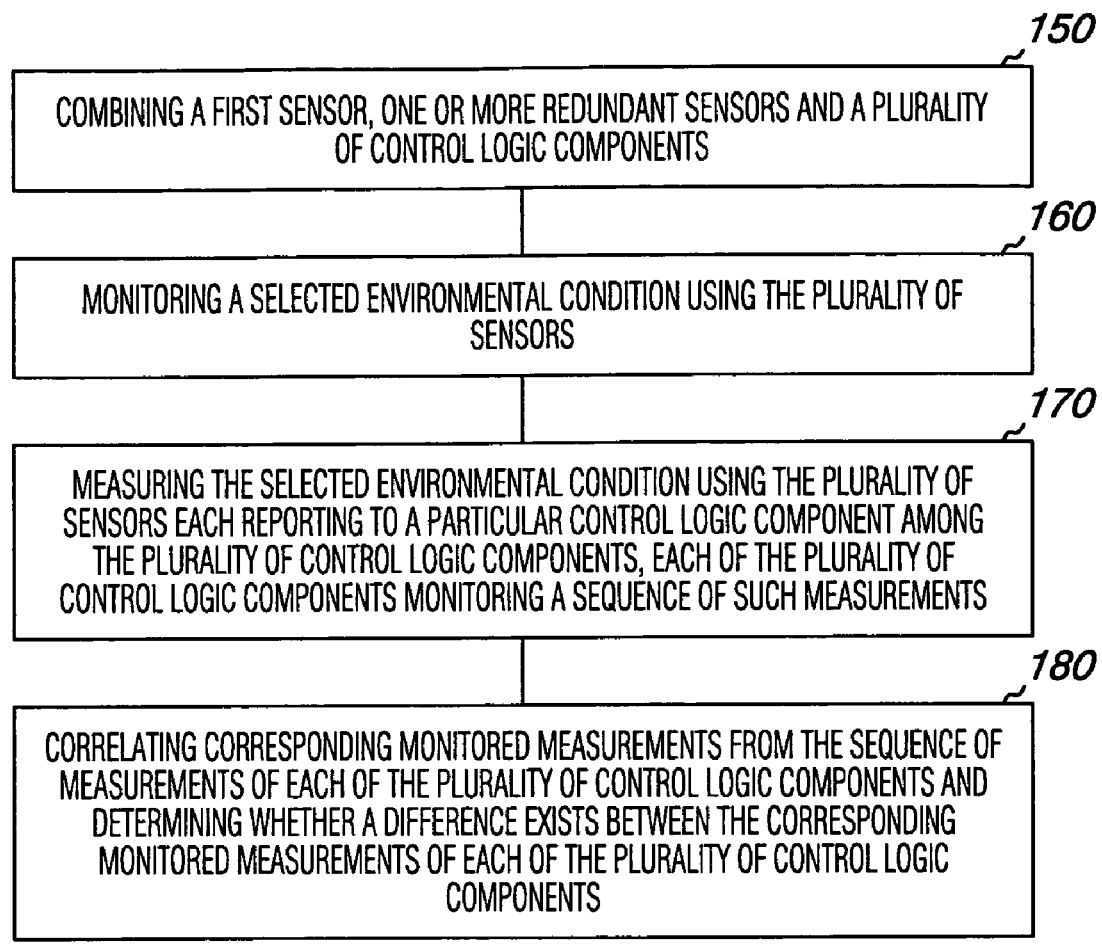
FIG. 11 is a block diagram illustrating a method of redundant monitoring according to an embodiment of the present disclosure.

FIG. 11 is a block diagram illustrating a method of redundant monitoring according to an embodiment of the present disclosure. Unless explicitly stated, the method embodiments described herein are not constrained to a particular order or sequence. Additionally, some of the described method embodiments, or elements thereof, can occur or be performed at the same, or at least substantially the same, point in time.

Again, embodiments described herein can be performed using logic, software, hardware, and/or ASICs, or combinations of these elements, and the like, to perform the operations described herein. Embodiments as described herein are not limited to any particular operating environment or to software written in a particular programming language. The elements described can be resident on any particular element of the systems, apparatuses, and/or devices shown herein, or otherwise.

Logic suitable for performing embodiments of the present disclosure can be resident in one or more devices and/or locations. Control logic components (e.g., processors, ASICs, non-processor- or non-ASIC-type logic circuits, microcontrollers, and/or microprocessors) used to execute operations described herein can include one or more individual modules that perform a number of functions, separate modules connected together, and/or independent modules.

The embodiment illustrated in FIG. 11 includes combining a plurality of redundant sensors and a plurality of control logic components, for example, into an enclosed circuit, as shown in block 150. In various embodiments, the plurality of redundant sensors can be used to sense a variety of environmental conditions, which can include temperature, humidity, and/or physical impact, among a number of other environmental conditions described in the present disclosure.

As such, the plurality of control logic components can be used to monitor a selected environmental condition using the plurality of redundant sensors, as shown in block 160. In some embodiments, monitoring temperature can, for example, be performed by measuring the temperature with a plurality of redundant silicon-based sensors (e.g., thermistors), where each of the control logic components associated therewith can include an A/D converter for converting analog signals into digital measurements.

Combining the redundant silicon-based sensors (e.g., thermistors) with the control logic components associated therewith including an A/D converter can, in some embodiments, enable reducing numbers of circuit components to achieve digital measurements of environmental conditions. Reducing numbers of circuit components can, in some embodiments, enable reducing a size of a tag, label, and/or package for a product.

Block 170 of the embodiment shown in FIG. 11 includes measuring the selected environmental condition using the plurality of redundant sensors, where each redundant sensor reports to a different control logic component among the plurality of control logic components, and each of the plurality of control logic components records a sequence of such measurements. In some embodiments, recording the sequence of measurements can include monitoring the selected environmental condition of a product during a number of time periods that include pre-transport storage, transport, and/or post-transport storage.

In various embodiments, monitoring the selected environmental condition using the plurality of redundant sensors can include the tag, label, and/or package monitoring the measurement of an ambient level of the environmental condition in the vicinity of an adjacent product and/or a level on and/or in the adjacent product. In some embodiments, the tag, label, and/or package can monitor the measurement of the ambient level in the surroundings instead of the level on and/or in the adjacent product. In various embodiments, the plurality of redundant sensors and the plurality of control logic components can be combined into an enclosed circuit in a discrete enclosure, where the discrete enclosure is selected from a group including a tag, a label, and/or a package for an adjacent product.

As illustrated in block 180 of the embodiment shown in FIG. 11, corresponding recorded measurements from the sequence of measurements of each of the plurality of control logic components can be correlated and a determination can be made as to whether a difference exists between the corresponding recorded measurements of each of the plurality of control logic components. In various embodiments, determining whether the difference exists between the corresponding recorded measurements can include determining whether the difference between the corresponding recorded measurements exceeds a predetermined threshold.

In some embodiments, determining whether the difference exists between the corresponding recorded measurements can include determining whether the difference is resolved within a number of subsequent recorded measurements from the sequence of recorded measurements. Among other results, waiting to issue an alert may preclude an unnecessary failsafe output being communicated to a user due to a short-term disparity in the corresponding recorded measurements.

In various embodiments of the present disclosure, circuitry containing a plurality of control logic components can be used to execute instructions for recording a first digital set of measurement data for an environment by sending, to a first control logic component, data from a first number of sensors and recording a second set of digital measurement data for the environment by sending, to a second control logic component, data from a second number of sensors. The instructions can be executed to cross-compare via a communication signal path by comparing the first digital set of measurement data with the second set of digital measurement data using the first control logic component and by comparing the second digital set of measurement data with the first set of digital measurement data using the second control logic component.

As a result, the instructions can be executed to record a first indicator of at least one of the comparisons of the first and second digital sets of measurement data having a difference exceeding a predetermined threshold value. Recording the first indicator can include operating to inform a user of circuit failure. The first indicator can, in various embodiments, include a number of indicators selected from a group including: flashing a number of lights (e.g., selected from a number of LEDs situated in various locations, as described herein or otherwise); sounding a number of alarms (e.g., selected from a number of alarms situated in various locations, as described herein or otherwise); sending a number of electromagnetic frequency signals (e.g., selected from a number of electromagnetic frequency signals, as described herein or otherwise); discontinuing recording of measurement data for the environment and recording a time for the circuit failure in a memory accessible to the user; and/or erasing recorded measurement data for the environment from the memory.

In some embodiments, instructions can be executed to record a second indicator of measurement data for the environment being outside a predetermined range if the comparisons of the first and second digital sets of measurement data have a difference not exceeding the predetermined threshold value. Recording the second indicator can include operating to inform a user of an environmental condition, where the second indicator can include a number of indicators. The number of indicators can similarly, in various embodiments, be selected from a group including: flashing a number of lights (e.g., selected from a number of LEDs situated in various locations, as described herein or otherwise); sounding a number of alarms (e.g., selected from a number of alarms situated in various locations, as described herein or otherwise); sending a number of electromagnetic frequency signals (e.g., selected from a number of electromagnetic frequency signals, as described herein or otherwise); and/or continued recording of measurement data for the environment and recording a number of time periods for the environmental condition in a memory accessible to the user.

A sensor in the second number of sensors can, in various embodiments, be redundant for a sensor in the first number of sensors. The redundant sensors and the first and second control logic components can, in various embodiments, be combined into a single circuitry configuration in a discrete enclosure, such as a tag, a label, and/or a package.

In various embodiments of the present disclosure, executable instructions can assign particular data values in the first digital set of measurement data to a number of particular time points and assign particular data values in the second digital set of measurement data to substantially the same particular time points in order to enable correlating the particular data values in the first and second sets of digital measurements. Consequently, executable instructions can cross-compare the particular data values in the first digital set of measurement data assigned to the number of particular time points with the particular data values in the second digital set of measurement data assigned to substantially the same particular time points.

As such, a redundant environmental monitoring system, according to the present disclosure, can, for example, include a first sensor connected to a first control logic component and a second sensor connected to a second control logic component, where individual output from the first control logic component and the second control logic component can represent separate measurement values of an environmental condition sensed by the first and second sensors at substantially the same time point. A failsafe logic component can, in various embodiments, receive input of the individual output from the first control logic component and the second control logic component, where the failsafe logic component can output an alert if a difference between the separate measurement values sensed by the first and second sensors at substantially the same time point exceeds a predetermined threshold value.

The system can, in various embodiments, include the first sensor also being connected to the second control logic component and the second sensor also being connected to the first control logic component, where each control logic component cross-compares the output from the first and second sensors. The first and second control logic components can, in various embodiments, be connected to communicate the cross-comparison such that, if the cross-comparison indicates the difference exceeds the predetermined threshold value, both the first and second control logic components are enabled to generate the alert.

Among the various embodiments of the present disclosure as described herein, a system can include a number of components selected from a group including: a first single connection A/D converter for converting analog output from the first sensor into digital input for the first control logic component and a second single connection A/D converter for converting analog output from the second sensor into digital input for the second control logic component; a first dual connection A/D converter for converting analog output from the first sensor into digital input for the first and second control logic components and a second dual connection A/D converter for converting analog output from the second sensor into digital input for the first and second control logic components; and/or a first incorporated A/D converter included in the first control logic component for converting analog output from the first sensor and a second incorporated A/D converter included in the second control logic component for converting analog output from the second sensor.

System embodiments can include among the various embodiments as described herein: a single electrical power source to supply electrical power to the first and second control logic components and/or components connected to the first and second control logic components; and/or a first electrical power source to supply electrical power to the first control logic component and/or components connected to the first control logic component; and/or a second electrical power source to supply electrical power to the second control logic component and/or components connected to the second control logic component.

The redundant environmental monitoring system as described herein can include an ASIC in which a subset or all of the components can be included. The components can, in various embodiments, include a number of components selected from a group including: redundant sensors for each of a number of environmental conditions; the first control logic component and the second control logic component to receive separate measurement values from the redundant sensors for each of the number of environmental conditions; a number of A/D converters to enable receipt of digital measurement values by the first and/or second control logic components from analog output by the redundant sensors for each of the number of environmental conditions; program memory and/or data memory for each of the control logic components; and/or first control logic component and/or second control logic component to analyze and/or compare input of the separate measurement values from the redundant sensors for each of the number of environmental conditions.

The failsafe logic component can, in various embodiments, be used to receive input from the first and second control logic components to determine whether output of a failsafe alert should be performed based upon analysis of such input. As described herein, the ASIC that includes the failsafe logic component is usable in a tag, a label, and/or a package to monitor a number of environmental conditions appropriate to quality control of an adjacent product.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the disclosure includes various other applications in which the above structures and methods are used. Therefore, the scope of various embodiments of the disclosure should be determined with reference to the appended claims, along with the full range of equivalents to which such claims are entitled.

Additionally, in reading this disclosure and claims, it should be noted that the indefinite article "a" or "an", as it is used herein, is not intended to limit the number of elements to one. Accordingly, the terms "a" and "an" should be viewed as meaning one or more unless such limitation is expressly stated or such meaning would be illogical based upon the arrangement of elements formed by such meaning. Further, the term "a number of" should be interpreted as meaning one or more.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. A method of providing redundancy in an environmental monitoring device, comprising:
    combining a first sensor, one or more redundant sensors, and a plurality of control logic components;
    monitoring a selected environmental condition using the redundant sensors;
    measuring the selected environmental condition using the redundant sensors each reporting to a particular control logic component among the plurality of control logic components, each of the plurality of control logic components monitoring a sequence of such measurements; and
    correlating corresponding monitored measurements from the sequence of measurements of each of the plurality of control logic components and determining whether a difference exists between the corresponding monitored measurements of each of the plurality of control logic components.

2. The method of claim 1, where monitoring the selected environmental condition includes monitoring a number of environmental conditions selected from a group including temperature, humidity, physical impact, tilt, vibration, pressure, light, radioactivity, presence of biological organisms, and chemical agents.

3. The method of claim 2, where monitoring temperature includes measuring the temperature with a plurality of silicon-based sensors, where each of the plurality of control logic components associated therewith includes an analog-to-digital converter for converting signals into digital measurements.

4. The method of claim 1, where monitoring the selected environmental condition includes monitoring the selected environmental condition of a product during a number of time periods that include pre-transport storage, transport, and post-transport storage.

5. The method of claim 1, where determining whether the difference exists between the corresponding monitored measurements includes determining whether the difference between the corresponding monitored measurements exceeds a predetermined threshold.

6. The method of claim 1, where determining whether the difference exists between the corresponding monitored measurements includes determining from a sequence of recorded measurements whether the difference is resolved within a number of subsequent recorded measurements.

7. The method of claim 1, where the method includes combining the redundant sensors and the plurality of control logic components into an enclosed circuit in a discrete enclosure, where the discrete enclosure is selected from a group including a tag, a label, and a package for an adjacent product.

8. The method of claim 7, where monitoring the selected environmental condition includes monitoring the measurement of an ambient level of the environmental condition in the vicinity of the adjacent product instead of a level on and in the adjacent product.

9. The method of claim 1, where the method includes operating to inform a user of circuit failure when a difference between the corresponding monitored measurements exceeds a predetermined threshold and operating to inform a user when a level of the selected environmental condition is outside a predetermined range.

10. A method of providing an environmental monitoring device, comprising:
    combining one or more sensors and one or more control logic components into an enclosed circuit;
    monitoring a selected environmental condition using the one or more sensors;
    measuring the selected environmental condition using the one or more sensors each reporting to a different control logic component among the one or more control logic components, each of the one or more control logic components measuring a sequence of such measurements; and
    correlating corresponding measurements from the sequence of measurements of each of one or more control logic components and determining whether a difference exists between the corresponding monitored measurements of each of the plurality of control logic components.

11. A method of providing redundancy in an environmental monitoring device, comprising:
    combining a plurality of redundant sensors and a control logic component;
    monitoring a selected environmental condition using the plurality of redundant sensors;
    measuring the selected environmental condition using the plurality of redundant sensors each reporting to the control logic component, where the control logic component separately monitors a sequence of such measurements from each of the plurality of redundant sensors; and
    correlating with the control logic component corresponding measurements from the sequence of measurements of each of the plurality of redundant sensors and determining with the control logic component whether a difference exists between the corresponding monitored measurements of each of the plurality of redundant sensors.

12. A redundant environmental monitoring system, comprising:
    a first sensor connected to a first control logic component and a second sensor connected to a second control logic component;

individual output from the first control logic component and the second control logic component representing separate measurement values of an environmental condition sensed by the first and second sensors at substantially the same time point;

a failsafe logic component that receives input of the individual output from the first control logic component and the second control logic component, where the failsafe logic component outputs an alert if a difference between the separate measurement values sensed by the first and second sensors at substantially the same time point exceeds a predetermined threshold value.

13. The system of claim 12, where the system includes the first sensor also connected to the second control logic component and the second sensor also connected to the first control logic component, where each control logic component cross-compares the output from the first and second sensors.

14. The system of claim 13, where the first and second control logic components are connected to communicate the cross-comparison such that, if the cross-comparison indicates the difference exceeds the predetermined threshold value, both the first and second control logic components are enabled to generate the alert.

15. The system of claim 13, where the system includes a number of components selected from a group including:
   a first single connection analog-to-digital (A/D) converter for converting analog output from the first sensor into digital input for the first control logic component and a second single connection A/D converter for converting analog output from the second sensor into digital input for the second control logic component;
   a first dual connection A/D converter for converting analog output from the first sensor into digital input for the first and second control logic components and a second dual connection A/D converter for converting analog output from the second sensor into digital input for the first and second control logic components;
   a first incorporated A/D converter included in the control logic of the first control logic component for converting analog output from the first sensor and a second incorporated A/D converter included in the control logic of the second control logic component for converting analog output from the second sensor;
   a single electrical power source to supply electrical power to the first and second control logic components, and components connected to the first and second control logic components; and
   a first electrical power source to supply electrical power to the first control logic component, and components connected to the first control logic component, and a second electrical power source to supply electrical power to the second control logic component, and components connected to the second control logic component.

16. The system of claim 13, where the system includes an application-specific integrated circuit in which the components are included, where the components include a number of components selected from a group including:
   redundant sensors for each of a number of environmental conditions;
   the first control logic component and the second control logic component to receive separate measurement values from the redundant sensors for each of the number of environmental conditions;
   a number of A/D converters to enable receipt of digital measurement values by the first and second control logic components from analog output by the redundant sensors for each of the number of environmental conditions;
   program memory and data memory for each of the control logic components;
   the first control logic component and the second control logic component to analyze and compare input of the separate measurement values from the redundant sensors for each of the number of environmental conditions; and
   the failsafe logic component to receive input from the first and second control logic components to determine whether output of a failsafe alert is performed based upon analysis of such input.

17. The system of claim 16, where the application-specific integrated circuit is usable in a tag, a label, and a package to monitor a number of environmental conditions appropriate to quality control of an adjacent product.

* * * * *